United States Patent [19]
Dixon

[11] Patent Number: 4,932,315
[45] Date of Patent: * Jun. 12, 1990

[54] DOOR WATER DEFLECTOR AND VENT

[76] Inventor: Alfred R. Dixon, 4023 Far Hill, Bloomfield Hills, Mich. 48013

[*] Notice: The portion of the term of this patent subsequent to Jan. 17, 2006 has been disclaimed.

[21] Appl. No.: 285,543

[22] Filed: Dec. 15, 1988

Related U.S. Application Data

[62] Division of Ser. No. 128,062, Dec. 3, 1987, Pat. No. 4,798,130.

[51] Int. Cl.$^5$ ............................................. B60H 1/26
[52] U.S. Cl. ..................................... 98/2.18; 428/352; 428/354
[58] Field of Search ...................... 98/2, 2.18; 296/146; 428/343, 344, 352, 354

[56] References Cited

U.S. PATENT DOCUMENTS

| | | | |
|---|---|---|---|
| 3,366,026 | 1/1968 | Herr et al. | 98/2 |
| 3,391,628 | 7/1968 | Ziegenfelder | 98/2.18 |
| 3,509,991 | 5/1970 | Hurst | 206/59 |
| 3,587,845 | 6/1971 | Wing | 206/57 A |
| 4,105,224 | 8/1978 | Rudebaugh et al. | 281/15 R |
| 4,150,186 | 4/1979 | Kazama | 428/140 |
| 4,171,397 | 10/1979 | Morrow | 428/195 |
| 4,377,968 | 3/1983 | Gerry | 98/41 R |
| 4,469,732 | 9/1984 | Isaksen et al. | 428/80 |
| 4,588,627 | 5/1986 | Isaksen et al. | 428/80 |
| 4,604,302 | 8/1986 | Isaksen et al. | 427/208.6 |
| 4,604,430 | 8/1986 | Isaksen et al. | 427/208.6 |
| 4,667,578 | 5/1987 | Hagenah | 98/2.18 |
| 4,696,848 | 9/1987 | Jones et al. | 428/80 |

FOREIGN PATENT DOCUMENTS

| | | | |
|---|---|---|---|
| 167511 | 12/1981 | Japan | 98/2.18 |
| 183308 | 10/1983 | Japan | 98/2.18 |

Primary Examiner—Harold Joyce
Attorney, Agent, or Firm—Basile and Hanlon

[57] ABSTRACT

A water deflector and venting apparatus comprising sheets with a polymer coating applied to both sides, treated to accept or release adhesive, an adhesive applied to one side of the sheets, the sheets being supplied in a stacked fashion for easy separation and application; the sheets may comprise a vent with an aperture over which is placed a Mylar flap for hinge-like operation, which is operable to allow air to pass in one direction upon pressurization of the automobile interior. Added sealing capability between the Mylar flap and the vent sheet may be achieved through the application of a foam layer between the sheet and the Mylar flap.

8 Claims, 2 Drawing Sheets

DOOR WATER DEFLECTOR AND VENT

This application is a division of application Ser. No. 07/128, 062, filed Dec. 3, 1987, now U.S. Pat. No. 4,798,130.

BACKGROUND OF THE INVENTION

1. Field of the Invention

The present invention is concerned with a water deflector and vent sheet of the type used in automotive assembly for sealing the interior of the automobile body against ingress of moisture and air.

2. Description of the Relevant Art

Such water deflecting sheets and venting apparatus are widely used in the automotive industry to protect the interior of the automobile body from ingress of moisture and to allow equalization of air pressure within the automobile body which is created by ventilation intake or door closings.

Generally, the deflector sheets are supplied without adhesive or other means of attachment. The sheets are generally waterproof, either due to the nature of the sheeting material or by application of surface coatings which, in effect, creates a composite material. During assembly of the automobile body, adhesive caulking or glue is applied to the perimeter of the body panel and the deflector sheet is then pressed into position.

Prior door vents generally consist of relatively complex rigid frame assemblies fabricated from metal, plastic, or other like materials. The rigid frame is mounted on the inner door panel in a vertical position using fasteners such as rivets or screws. To prevent ingress of air and moisture, and to allow air passage out of the vehicle upon pressurization of the interior space, a flap of a flexible material such as rubber is hingedly mounted over air passages in the frame. This mounting method allows the flap to open in a hinge-like manner when pressure is increased within the vehicle, and to close, due to the weight of the flap, against the frame once interior pressure has been equalized. This prior design relies on the weight of the flap to close the passages when air pressure has been equalized.

The present invention is directed to door water deflectors and door vents of greatly simplified design which are of a flat configuration, and are supplied in stacks with adhesive already applied. The stacks are simple to peel apart and press into position on the automobile body panel.

SUMMARY OF THE INVENTION

In accordance with the present invention, a door water deflector comprises sheets which are supplied with a polymer coating applied to both sides for waterproofing and other purposes. The side of the sheet facing the inner door panel has a black polymer coating which has been electrically treated to accept an adhesive application. The side of the sheet facing the interior of the automobile has a clear polymer coating which has been treated with a silicone coating which resists attraction of adhesive. An adhesive bead is subsequently applied to the electrically treated side of the sheet in a pattern which corresponds with the automobile panel to which the deflector sheet is to be applied. Since the adhesive will not adhere to the silicone treated poly coated side of the sheet, the clear poly side acts as a release paper which allows the sheets to be stacked, one upon another for ease of shipment and handling. The clear poly coating with silicone treatment acts as a release paper for the deflector sheet upon which it is stacked. The stacks of deflector sheets may be easily peeled apart and simply placed and pressed into position on the automobile body panel, eliminating the need for utilizing complex gluing apparatus or time consuming, labor intensive hand operations on the assembly line.

Also in accordance with the present invention, a door vent comprises a flat frame board which may be of any suitable rigid material. The board may be prepared in a similar fashion to that described above, and vent holes through which air may pass from the interior of the vehicle are provided. A Mylar sheet, sized slightly larger than the vent holes in the board, is placed on the side of the board facing the door inner panel. The Mylar sheet is attached to the board along one edge only which allows the sheet to open and close over the vent holes in the board in a hinge-like manner. The Mylar has beneficial memory characteristics which the flaps used in the prior art do not have. The memory characteristic causes the flaps to remain flat against the frame board, thus providing an air tight seal whose performance far exceeds that of the prior art. The two-piece simplified assembly eliminates the complex frame and flap combination and its labor intensive assembly required in the prior art.

Added sealing capability may be provided through the last application of a thin foam-like material between the board and the Mylar flap. The board may be supplied in stacks with adhesive already applied as described above. The board is attached to the body panel in a simple place-and-press technique which eliminates the need for complex attachment means such as screws, rivets, or other fasteners used in the prior art.

Other objects and features of the invention will become apparent by reference to the following specification and to the drawings.

DESCRIPTION OF THE PREFERRED EMBODIMENT

Figure 1:
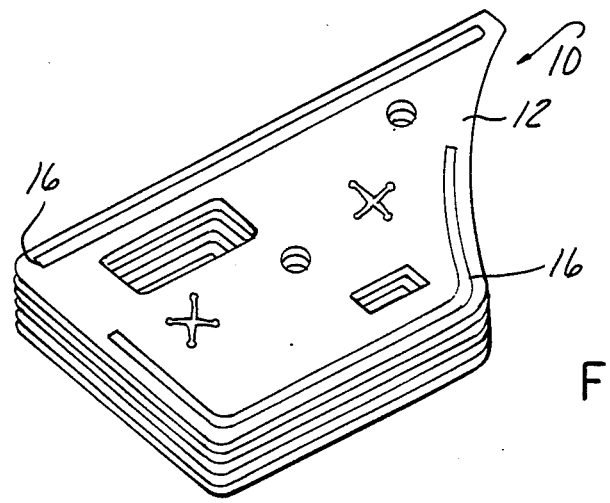
FIG. 1 is a perspective view of a stack of door water deflectors of the present invention with adhesive applied thereto.
Figure 2:
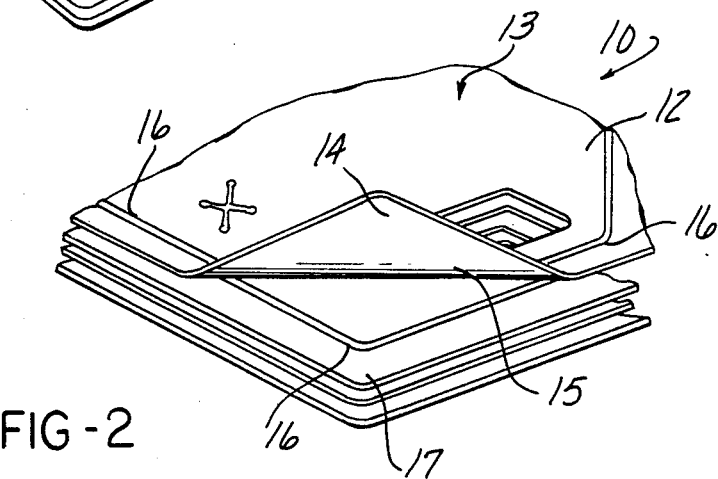
FIG. 2 is a perspective view of an enlarged section of FIG. 1 showing a door water deflector partially removed from the stack revealing the release coating layer.

In FIGS. 1 and 2 there is shown a typical example of a first embodiment of the present invention. The door water deflector, designated generally as 10, is made of suitable liner material which is cut to match the dimensions of each particular installation. The liner material may be of a polymer sheeting or of a layered polymer paper sheeting. The deflector 10, when installed in position on the inner side of an automobile body panel 11, as shown in phantom in FIG. 6, will cover all holes in the inner panel to prevent the ingress of moisture and air.

When the layered polymer-paper sheeting is the preferred embodiment, a polymer coating 12 is applied to a first side 13 of the deflector 10, which will contact the inner panel 11 of the automobile when installed. In a preferred embodiment, the polymer coating is a 10# black poly. This is a deposition specification which indicates that 10 pounds of polymer is deposited per 3,000 square feet of paper liner. The polymer coating 12 effectively waterproofs the paper deflector 10 to protect it from moisture which collects on the interior of the automobile panel 11 to which it is attached.

The first side 13 is treated by a process which allows the poly surface to adhere to a hot melt pressure sensitive adhesive. In a preferred embodiment, the treatment is an electrical discharge treatment referred to as a Corona treatment. The results of the treatment are measured in Dynes; with a preferred embodiment having a Dyne level in a range between 35 and 44. The treatment is not required to be applied to the entire inner poly layer, but must at least cover areas where adhesive is to be applied.

An outer poly layer 14 facing the interior of the automobile body, as seen in FIG. 2, is applied to a second side 15 of the deflector 10 when the layered polymer-paper sheeting is used. In a preferred embodiment, the outer poly coating comprises a 10# polyethylene. The outer poly coating 14 is not treated to accept an adhesive, but, conversely, this coating 14 is treated with a silicone which acts as a release coating on the liner. The treatment is not required to be applied to the entire outer poly layer, but must at least correspond to areas where adhesive is applied on the inner poly layer. In a preferred embodiment, the second side 15 has a release specification of less than 30 gm on the Kile test which determines the force required to peel the layers apart at a specified standard pull rate.

To the inner side 13 is applied, on areas treated to accept adhesive, a bead of pressure sensitive adhesive 16. The adhesive 16 is applied to the deflector 10 in a predetermined pattern which will match the automobile panel on which the deflector 10 will be applied.

The three dimensional nature of the adhesive bead gives the adhesive depth, enabling it to mold to the surface of the body panel. This characteristic allows a complete watertight seal should the water deflector become wrinkled prior to installation, unlike flat adhesives (i.e., sticky surfaces) which will only contact the body panel if the deflector is completely flat.

Figure 8:
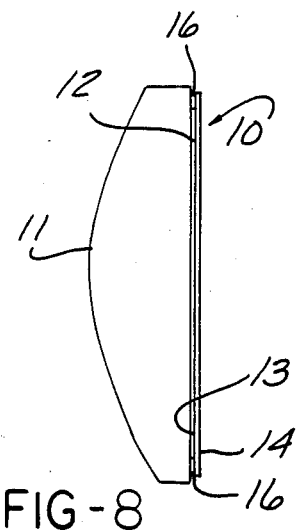
FIG. 8 is a schematic view taken on line 8—8 of FIG. 6 showing the water deflector installed on the inner door panel.

A plurality of deflector sheets 10 to which the pressure sensitive adhesive 16 has been applied are stacked one on top of another in the configuration shown in FIGS. 1 and 2. Release paper is not required between the deflector sheets 10, since the silicone treated side 15, as seen in FIG. 2, acts as the release surface for the deflector sheet 17 with which it is in contact. A deflector sheet 10 is readied for application by peeling a sheet from the top of a stack, as seen in FIG. 2. The three dimensional characteristics of the adhesive bead allows for easy peeling since a space is created between each sheet. Due to the release characteristics of the second side 15, the adhesive 16 on the next sheet 17 in the stack will remain intact and will not be attached to the sheet being lifted. Once a liner 10 is separated from the stack, it may be pressed into place as shown in phantom in FIG. 6 and in FIG. 8.

The supplying of door water deflectors in this fashion eliminates the need for gluing equipment and time consuming, labor intensive hand operations on the assembly line and saves times in positioning and attaching the liners.

Figure 3:
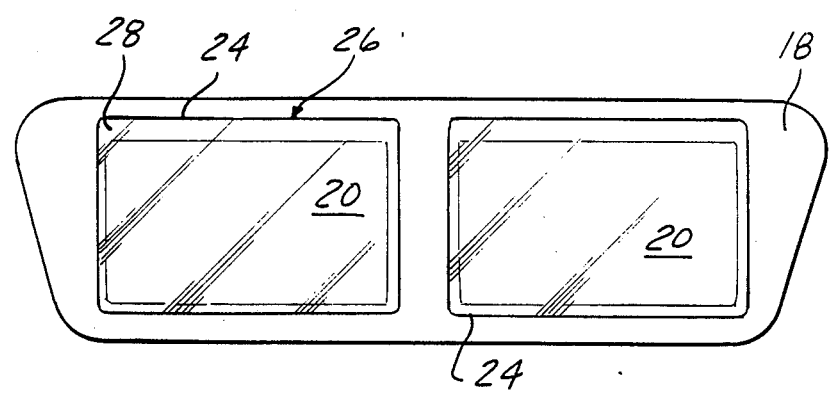
FIG. 3 is a front elevational view of a door vent with Mylar flaps applied.
Figure 4:
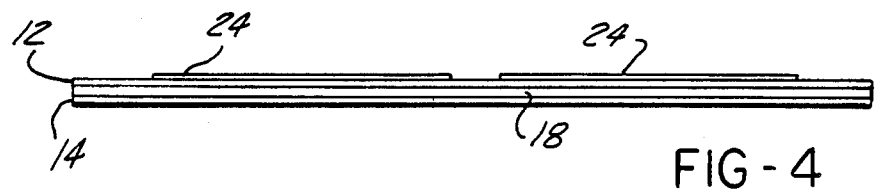
FIG. 4 is a side view of FIG. 3 showing the relationship between the liner and the Mylar flaps.
Figure 5:
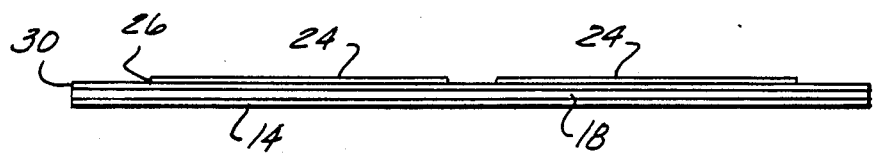
FIG. 5 is an alternative edge view of FIG. 3 showing the foam layer disposed between the liner and the Mylar flap.
Figure 6:
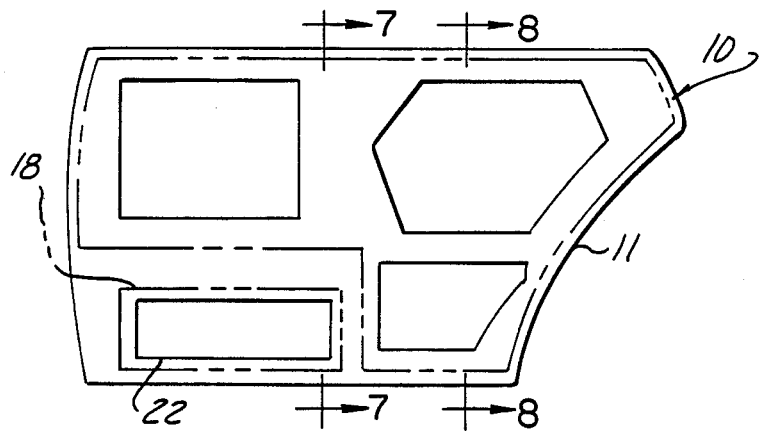
FIG. 6 is a front elevational view of a typical inner body panel with the door water deflector and vent apparatus of the present invention shown in phantom.

A second embodiment of the above invention comprises a door vent to be applied to the inside door panel of an automobile body as is shown in FIGS. 3 through 5. The door vent has a frame 18 which is fabricated from a flat composite board or other similar material. The board is cut to match the dimensions of a particular installation and has apertures 20 formed therein to allow the passage of air. The vent, when installed, will cover a body aperture 22 formed in the inner door panel, as shown in FIG. 6, used for venting the automobile interior.

The frame board may be treated in a fashion similar to the above deflector sheet embodiment. A black polymer coating 12 is applied to the surface of the frame which will contact the automobile body panel and a second polymer coating 14 is applied to the side of the vent frame which is to face the interior of the automobile. The black polymer coating 12 will receive a similar Corona treatment which will allow it to adhere to an adhesive applied to the surface. Similarly, the second polymer coating 14 will receive a silicone treatment, giving it the release characteristics desired.

In another embodiment, a release paper may be applied over the adhesive bead, thus forgoing the silicone treatment. Fixedly attached to the vent frame are single precut Mylar sheets 24 which are cut to be slightly larger than the air passage apertures 20 provided in the frame. One Mylar sheet 24 may be provided to cover the entire vent frame or multiple sheets may be provided to cover each air passage aperture 20. The Mylar sheets 24 are provided with a strip area 26, at which point the Mylar sheets may be attached to the frame. Attachment means may consist of an adhesive, a heat seal, a dielectric seal, a sonic weld or other comparable means. The seal 28 is applied along the top edge of the Mylar sheet so that only one edge of the sheet will be restrained. The Mylar sheets 24 are then operable in a hinge-like manner to allow air passage through the air passage apertures 20 in the vent frame 18. Because the Mylar sheets 24 are larger than the air passage apertures 20, the flaps allow air passage through the vent in only one direction. Upon equalization of air pressure on both sides of the vent, the Mylar sheet 24, due to the memory characteristics of Mylar sheeting, will be returned to its original flat position over the vent aperture 20 and will prevent air passage through the vent in a second direction in to the interior of the automobile.

As can be seen in FIG. 5, a second embodiment of the flap may be provided with a foam layer 30 positioned between the vent frame 18 and the Mylar sheet 24. The foam layer 30 acts to increase the sealing capability of the Mylar sheet 24 against vent frame 18.

The vent of the present invention which utilizes a die cut frame board and die cut Mylar sheet in place of the molded plastic frames of complex shape with separate closures and complex attaching means greatly simplifies the production of the vent, thus greatly reducing cost while simultaneously increasing reliability through the memory characteristics of the Mylar.

Figure 7:
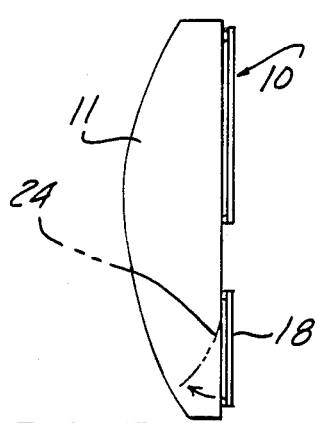
FIG. 7 is a schematic view taken on line 7—7 of FIG. 6 showing the vent apparatus installed on the inner door panel.

Once the Mylar sheets 24 have been applied to the vent frame 18, adhesive may be applied to the door vent assembly in a manner similar to that described for the water deflector above. Because the black polymer layer 12 has been Corona treated to accept adhesive, and the second polymer layer 14 has been silicone treated for releasability, the vent assemblies are stackable with the second polymer layer 14 acting as a release surface for the board upon which it is stacked. In the alternative embodiment, a release paper is used over the adhesive bead to aid in peeling the vents apart. The vent assembly is easily applied to the automobile body panel 11 by removing one vent assembly from the stack and pressing the vent assembly in place in its designated position on the door or body panel as shown in phantom in FIG. 6 and in FIG. 7.

Various embodiments of the invention have been described in detail above in relation to door water deflectors and vent assemblies. It will be apparent to those skilled in the art that the disclosed embodiments may be modified; therefore, the foregoing description is to be considered exemplary, rather than limiting, and the true scope of the invention is that defined in the following claims.

What is claimed is:

1. An automobile body panel liner useful for maintaining a water and air barrier between the interior and exterior of an automobile body panel in an automobile body, said liner comprising:
    (a) a waterproof liner sheet formed to the dimensions of a selected portion of said automobile body panel, said liner sheet having a first face and a second face, said first face of said liner being adapted for engagement with said automobile body panel;
    (b) means forming at least one aperture disposed on said liner sheet for allowing the passage of air therethrough, and positioned on said sheet so as to coincide with similar, but slightly larger, body aperture formed in said automobile body panel;
    (c) a flexible plastic sheet flap for covering said sheet aperture and configured to be slightly larger than said sheet aperture, said sheet flap having memory characteristics which cause it to return to its original position following venting of the automobile interior; and
    (d) attaching means at the top edge of said sheet flap for fixedly attaching said sheet flap to said first face of said liner sheet to cover said air passage aperture, wherein said sheet flap is operable in a hinge-like manner to move from a first closed position where said sheet flap is closed over said air passage aperture to a second open position where said sheet flap allows air passage through said air passage aperture, in only one direction, when air passage is increased within said automobile body, and wherein said sheet flap is returnable to its original position over said air passage aperture to prevent air passage in a second direction.

2. The panel liner defined in claim 1 wherein said liner sheet further comprises:
    (a) a rigid paper liner board;
    (b) a first polymer coating applied to said liner on a first face of said liner board;
    (c) a second polymer coating applied to said liner on a second face of said liner board.

3. The panel liner defined in claim 2 wherein said first polymer coating comprises 10# black polyethylene having a Corona treatment applied rendering a Dyne level of 35 to 44.

4. The panel liner defined in claim 2 wherein said second polymer coating comprises 10# clear polyethylene having a release level less than 30 gm.

5. The panel liner defined in claim 1 wherein a foam layer is applied to said liner to increase sealing between said sheet flap and said liner sheet.

6. The panel liner defined in claim 1 further comprising an adhesive bead applied to said first face for mounting said liner sheet to said panel, said adhesive comprising a bead of pressure sensitive solution, adherent to said first face of said liner sheet and to said automobile body panel and wherein said adhesive will not adhere to an opposite second surface of said liner sheet.

7. The panel liner defined in claim 1 wherein said flexible plastic sheet flap is a Mylar sheet.

8. An automobile body panel liner useful for maintaining a water and air barrier between the interior and exterior of an automobile body panel in an automobile body, said liner comprising:
    (a) a waterproof liner sheet formed to the dimensions of a selected portion of said automobile body panel, said sheet formed with at least one aperture for allowing the passage of air therethrough, said aperture positioned on said sheet so as to coincide with similar, but slightly larger, apertures formed in said automobile body panel;
    (b) a first face of said liner sheet for engagement with said automobile body panel having a surface characteristic which ensures adhesion of an adhesive;
    (c) a second face of said liner sheet for facing the interior of said automobile body which may have a surface characteristic which assures release of any adhesive contacting said surface;
    (d) a flexible sheet flap for covering each of said apertures in said liner sheet configured to be slightly larger than each of said air passage apertures, said sheet having memory characteristics which cause it to return to its original position following venting of the automobile interior;
    (e) means applied to the top edge of said sheet flap for fixedly attaching said flap to said first face of said liner sheet in a configuration to cover each air passage aperture; and
    (f) a second adhesive applied to said first face of said liner sheet for mounting said liner sheet for mounting said liner sheet to automobile body panel;

wherein said sheet flap is operable in a hinge-like manner to allow air passage through said air passage aperture in said liner sheet in only one direction when air pressure is increased within said automobile body, and wherein said sheet flap is returnable to its original flat position over said air passage apertures to prevent air passage in a second direction;

wherein a plurality of said automobile body panel liners may be pre-glued and stacked, one upon another, said adhesive adhering to said first face of said liner sheet to facilitate simple pick-up and press-in-place installation onto said body panel.

* * * * *